March 11, 1952  G. E. DATH  2,588,487
SHOCK ABSORBER FOR RAILWAY CAR TRUCKS
Filed Dec. 7, 1948
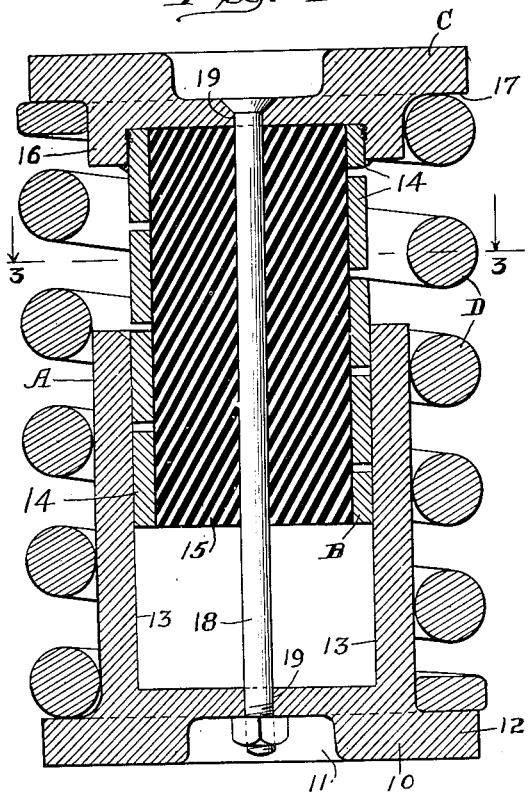
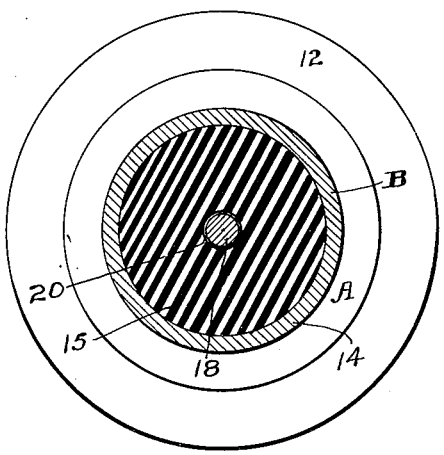
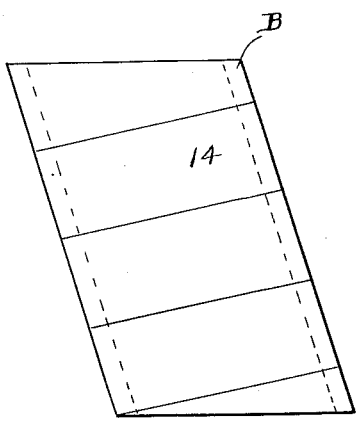
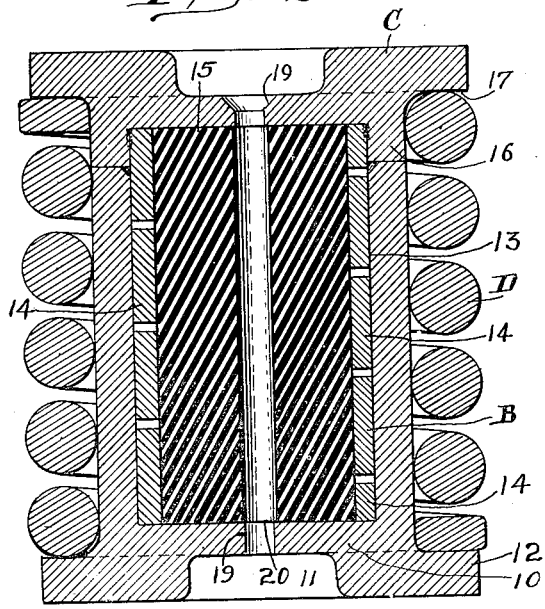
Inventor
George E. Dath.
By Henry Fuchs
Atty Patented Mar. 11, 1952

2,588,487

UNITED STATES PATENT OFFICE 2,588,487

SHOCK ABSORBER FOR RAILWAY CAR TRUCKS

George E. Dath, Mokena, Ill., assignor to W. H. Miner, Inc., Chicago, Ill., a corporation of Delaware Application December 7, 1948, Serial No. 63,950

6 Claims. (Cl. 267—9)

This invention relates to improvements in shock absorbers for snubbing the action of truck springs of railway cars.

One object of the invention is to provide a shock absorber of the character indicated providing for substantially uniform resistance throughout the action of the device, comprising a friction casing and friction means slidingly telescoped within the casing, wherein the friction means is in the form of a helically coiled spring element and a rubber core under compression enclosed by said element to forcibly press the spring element against the interior of the casing to produce the desired frictional contact between the spring element and casing during relative sliding movement of the same with respect to each other.

A further object of the invention is to provide a shock absorber comprising a friction casing and friction means slidingly telescoped within the casing, wherein the friction means is in the form of a helically coiled spring element and a rubber core enclosed by said element, the spring element and the enclosed rubber core being in distorted condition in the assembled mechanism to forcibly press the spring element against the interior of the casing.

Other objects of the invention will more clearly appear from the description and claims hereinafter following.

In the accompanying drawing forming a part of this specification, Figure 1 is a transverse, vertical sectional view of the improved shock absorber. Figure 2 is a view similar to Figure 1, showing the mechanism compressed. Figure 3 is a horizontal sectional view, corresponding substantially to the line 3—3 of Figure 1. Figure 4 is a side elevational view of the inner friction element or unit shown in Figure 1, illustrating the condition of the same before being assembled with the other parts of the mechanism.

As illustrated in the drawing, my improved shock absorber comprises broadly a friction casing A, a friction unit B slidingly telescoped within the casing, an end follower C carrying the friction unit, and a helically coiled spring D surrounding the casing A and friction unit B and yieldingly opposing relative movement of the follower and friction casing toward each other.

The friction casing A is in the form of a substantially cylindrical, tubular member, open at the top and closed by a transverse wall 10 at the bottom end, said wall being provided with an outwardly opening central seat 11, adapted to accommodate the usual centering projection on the corresponding spring follower plate of the truck spring cluster of a railway car. The bottom wall 10 extends laterally outwardly beyond the body portion proper of the casing, providing an annular follower flange 12, which forms an abutment for the lower end of the coil spring D. The interior side wall of the casing A presents a cylindrical friction surface 13.

The friction unit B comprises a helically coiled spring 14 formed from a flat bar of considerably greater width than thickness, and a rubber core 15 enclosed by the spring 14. The rubber core 15 is in the form of a block of substantially circular, transverse cross section, fitting within the spring 14, which is of circular, transverse, interior cross section. As shown in Figure 4, the spring 14, before being assembled with the follower C, has its longitudinal central axis inclined or leaning to the left when the spring is stood on its base, and the enclosed rubber core 15 has its longitudinal central axis similarly inclined. The core 15 substantially fills the spring 14 and presents flat top and bottom ends, which are coincident respectively with the planes of the top and bottom ends of the coil spring 14. In other words, the spring 14 and rubber core 15 are formed in such a manner, when manufactured, that the unit B leans to the left, when stood on end, as shown in Figure 4. Thus, when the friction unit B is forcibly flexed toward its upright position by being fixed to the follower C, it is placed under tension, the resiliency of the rubber core 15 and of the spring 14 tending to force the same to assume their leaning positions. The friction unit B, in its righted position, is slidingly telescoped within the casing A and, due to its distorted condition, forces the spring D thereof into tight frictional contact with the friction surface 13 of the side wall of the casing A. The parts are proportioned so that the rubber core 15 is under predetermined radial compression when the unit B is assembled within the casing A.

The end follower C is in the form of a circular disc having a depending annular flange 16 thereon, concentric with the central vertical axis of the disc and in alignment with the casing A. The follower C bears on the upper end of the friction unit B with the upper end portion of said unit surrounded by the annular flange 16, the spring 14 closely fitting within the seat provided by said flange and being welded to the latter to secure said unit in its righted position on the follower. The disclike follower C extends laterally outwardly beyond the flange 16 thereof, as shown in Figures 1, 2, and 3, thus providing an abutment 17 for the upper end of the coil spring D. The follower disc is further provided with an upwardly opening, central seat, adapted to accommodate the usual centering projection provided on the corresponding spring follower plate of the truck spring cluster.

The spring D, which is in the form of a helical coil, surrounds the casing A and the unit B and has its top and bottom ends bearing respectively on the follower C and the follower flange 12 of the casing A. This spring yieldingly opposes relative movement of the casing and friction unit toward each other lengthwise of the mechanism.

In assembling the mechanism, the unit B is first secured to the follower C by welding the spring 14 to the flange of the same while said unit is forcibly held in righted position. Then the outer coil spring D is placed over the casing A and the friction unit B is forcibly telescoped within the upper end of the casing A, thereby slightly contracting the spring 14 and placing the rubber core 15 under initial compression. The mechanism is then compressed to a slight extent. In this partially compressed condition, the parts of the mechanism are temporarily secured together by a retainer bolt 18 engaged through suitable openings 19—19 provided in the follower C and the wall 10 of the casing A, and a central bore 20 provided for that purpose in the rubber block 15. The bolt 18 is used for holding the parts assembled for handling and shipment and is removed when the shock absorber is placed in service on a railway car.

As will be understood, my improved shock absorber, when used as a snubber in connection with the truck springs of a railway car, takes the place of at least one of the usual spring units of each spring cluster of truck springs and is interposed between the top and bottom follower plates of the cluster.

In the operation of my improved snubber, upon the springs of the spring cluster of the truck of a railway car being compressed between the spring follower plates of the cluster, my improved shock absorber, which is also interposed between the spring follower plates, will be compressed with the springs, and the friction element or unit B forced inwardly of the casing A opposed by the spring D. Due to the frictional contact provided between the spring 14 and the casing A, relative movement of these parts is frictionally opposed and the action of the springs of the cluster effectively snubbed.

I claim:

1. In a friction shock absorber, the combination with a casing; of a friction unit slidingly telescoped within the casing for movement bodily lengthwise with respect to the casing, said unit including a rubber block and a coil spring surrounding said block; a follower to which said spring is locked against lateral displacement, said block and spring being under canting tension to force said spring into tight frictional engagement with the casing; and spring means surrounding said unit and casing and bearing at opposite ends on said unit and casing for yieldingly resisting lengthwise relative approach of said unit and casing and opposing relative lateral displacement of said follower and casing.

2. In a friction shock absorber, the combination with a casing; of a follower movable lengthwise of the mechanism toward and away from the casing; a friction unit slidingly telescoped within the casing, said unit including a coil spring rigidly connected to said follower and in sliding frictional engagement with the interior wall of said casing, said coil spring, before assembly with said casing, having its longitudinal axis inclined to a plane normal to its base, said spring, in the assembled condition with the casing, being distorted, with its longitudinal axis normal to the plane of its base, thereby placing the spring under tension to force the same into tight contact with the interior of the casing; and spring means opposing relative lengthwise movement of said unit and casing toward each other, said spring having shouldered engagement with the casing and follower to resist lateral displacement of said follower and casing with respect to each other.

3. In a friction shock absorber, the combination with a casing; of a follower movable lengthwise of the mechanism toward and away from said casing; a friction unit slidingly telescoped within the casing, said unit including a coil spring and a rubber core enclosed by said spring, said spring being rigidly connected to said follower and having sliding frictional contact with the interior wall of the casing, said unit, before assembly thereof with the casing, having the longitudinal axis of said coil spring inclined to a plane normal to the base of the spring, said spring, in the assembled condition of the friction unit and casing, being distorted, with its longitudinal axis normal to the plane of its base, thereby placing the friction unit under tension to force said spring into tight frictional contact with the interior wall of the casing; and spring means yieldingly opposing lengthwise movement of said unit and casing toward each other, said spring means having shouldered engagement with said follower and casing to oppose relative lateral displacement of said follower and casing with respect to each other.

4. In a friction shock absorber, the combination with a casing; of a follower having a central projecting tubular boss thereon; a friction unit slidingly telescoped within the casing, said unit including a coil spring and a rubber core under initial compression enclosed by said spring, said spring having one end tightly fitting within said tubular boss and having its other end telescoped within the casing in sliding frictional contact with the interior wall of said casing, said unit being under canting tension to press said spring against said interior wall of the casing; and a coil spring yieldingly opposing relative lengthwise movement of the friction unit and casing toward each other, said last named spring having opposite ends thereof telescoped over said boss and casing.

5. In a friction shock absorber, the combination with a cylindrical friction casing having a follower flange at its outer end; of a follower, said follower and casing being relatively movable toward and away from each other; a coil spring fixed to said follower and projecting into said casing, said spring being telescoped within the casing; a rubber core within said spring, said core being under initial radial compression within said spring to hold the latter in frictional contact with the interior of the casing; and a coil spring surrounding said casing and unit and having its opposite ends bearing on the follower flange of the casing and said follower.

6. In a friction shock absorber, the combination with a friction casing; of a follower, said follower and casing being relatively movable lengthwise of the mechanism toward and away from each other; a centrally disposed tubular boss on said follower projecting toward said casing; a coil spring member having one end tightly fitting within said boss of said follower, and having its other end slidingly telescoped within the casing; a rubber core enclosed within the spring, the core and spring being distorted to force said spring into tight frictional engagement with the interior wall of the casing; and an additional coil spring opposing relative movement of said follower and casing toward each other, said casing and said boss extending into opposite ends of said last named spring and closely fitting the same.

GEORGE E. DATH.

REFERENCES CITED

The following references are of record in the file of this patent:

UNITED STATES PATENTS

| Number | Name | Date |
|---|---|---|
| Re. 6,037 | Vose | Sept. 1, 1874 |
| 1,169,863 | Peycke | Feb. 1, 1916 |
| 2,136,908 | Pierce et al. | Nov. 15, 1938 |
| 2,212,759 | Tea | Aug. 27, 1940 |
| 2,459,537 | Oberstadt | Jan. 18, 1949 |